United States Patent Office 3,180,777
Patented Apr. 27, 1965

3,180,777
METHOD OF BONDING METAL TO METAL AND TO OTHER SURFACES USING A FORMAMIDE STARTER FOR GLYCOL ACRYLATE ADHESIVES
Wolf Karo, Huntingdon Valley, Pa., assignor to The Borden Company, New York, N.Y., a corporation of New Jersey
No Drawing. Filed June 11, 1964, Ser. No. 374,288
11 Claims. (Cl. 156—310)

The invention relates to bonding surfaces with acrylate ester compositions. It is particularly useful in bonding surfaces of polyvalent metals with the exclusion of air and will be first illustrated by description in connection therewith.

This application is a continuation-in-part of our application Serial No. 119,818, filed June 27, 1961, now abandoned.

In using the acrylate esters of glycols heretofore applied for such purpose in the form of ethenoid monomers, there have been difficulties because of non-polymerization of the esters on such metals as zinc, cadmium and tin and slowness of initiation of polymerization on many other metals.

The present invention provides a process and composition which are satisfactory with the three metals named and which accelerate the bonding of other metals, examples being iron of any commercial variety including steel and stainless steel, aluminum, copper, nickel, platinum, other metals of groups III–VIII of the Periodic Table of the chemical elements, and alloys or compositions thereof, e.g., brass and bronze, and chromium plated metals or alloys.

Briefly stated, the invention comprises the herein described process of bonding surfaces, one of which at least is metallic, by first applying formamide as a starter to one or both of the surfaces, applying the monomeric acrylate or methacrylate ester of the selected glycol between the two surfaces, and plying said surfaces together. In one embodiment the invention comprises the incorporation into the starter of "butyl Carbitol" or like moderator of the strength of the bond to be produced. Other embodiments include the use, as the initiator of polymerization or setting of the ethenoid ester, of ditertiary butyl peroxide or other t-alkyl peroxides, in order to improve the storage life of the mixed initiator and said ester over that with other organic peroxide initiators.

The monomer which is to constitute the resin in the set adhesive bond is supplied as an acrylate ester, i.e., a diacrylate or dimethacrylate, of any water soluble glycol, examples of which that I use are neopentyl glycol, tetraethylene glycol, polyethylene glycol (e.g., grades 400 or 1540), polypropylene and polyisopropylene glycols, and ethylene glycol and monoacrylates and monomethacrylates of $C_1$–$C_2$ alkyl ethers of the said glycols, e.g., ethoxyethylene or methoxypolyethylene glycol. The methacrylic acid represented in the ester is the alpha-methacrylic.

I have found no satisfactory substitute for formamide as the starter or primer for treatment of zinc, cadmium or tin before the application thereto of the acrylate ester. The formamide, when the body of the adhesive is applied thereover, dissolves in the adhesive. With a representative metal, the formamide starts the cure within about 5 minutes. I consider the formamide to act by increasing the effectiveness of contact of the monomeric ester with the metal surface or ions thereof.

The inhibitor used is any commercial retarder of polymerization of monomeric acrylate esters. Hydroquinone is the one that I commonly use. Others that are somewhat less satisfactory but usable are pyrogallol, quinhydrone and monophenyl, other monoaryl, monobutyl or other mono-lower-alkyl ether of hydroquinone.

Suitable initiators of ethenoid bond polymerization to be incorporated in the acrylate ester are tertiary alkyl compounds, particularly tertiary butyl peroxy compounds, e.g., di-tertiary butyl peroxide, tertiary butyl hydroperoxide, tertiary butyl perbenzoate and di-tertiary butyl perphthalate, the latter being used in dibutyl phthalate as solvent for the otherwise solid material. Other peroxy initiators that may be used are any that initiate ethenoid bond polymerization of acrylate esters as for example methyl ethyl ketone peroxide, cumene hydroperoxide and diisopropylbenzene hydroperoxide.

Accelerators of the initiator such as cobaltic compounds, ascorbic acid, and amines, sometimes used with the present type of initiators, are not necessary when the formamide starter is used, although these may be incorporated in formamide to bring about modification in bond strengths particularly when dissimilar metals are to be bonded.

When it is desired to decrease the strength of the bond obtained by my process to such an extent that the seal between a bolt and nut, for example, may be ruptured and the nut removed without breaking the bolt or nut, I may and suitably do incorporate into the composition, as into the formamide primer, a moderator of strength of the bond in the set adhesive. Such a moderator is the glycol ether, butyl Carbitol $C_4H_9O$—$C_2H_4O$—$C_2H_4OH$ or any other mono- or di-alkoxy diethylene glycol of the formula RO—$C_2H_4$—O—$C_2H_4$—OR' in which R is an alkyl group having 3–6 carbon atoms and R' is either any $C_1$–$C_3$ alkyl or hydrogen and preferably hydrogen.

As to proportions, the following table shows the several ranges that are permissible and also those that are recommended commercially without showing the proportion of the starter to the monomer.

| Component | Parts by Weight | |
|---|---|---|
| | Permissible | Recommended |
| Monomer Composition: | | |
| Acrylate ester | 100 | 100 |
| Initiator | 0.05–20 | 0.1–10 |
| Inhibitor | 0.0005–0.5 | 0.001–0.1 |
| Starter Composition: | | |
| Formamide | 100 | 100 |
| Moderator of bond strength | 0–100 | 2–10 |

Proportions of the initiator and inhibitor are any that are conventional in initiating polymerization of the acrylate esters of glycols or polyglycols, as in tetraethyleneglycol dimethacrylate. I obtain best results, however, when using a relatively large proportion of initiator such as shown in the second column above.

The amount of starter used may be enough to film over the surface to be bonded but need not cover the entire surface. Amounts adequate to spot or speckle the metal surface activates localized polymerization and the activation so induced spreads to nearby areas, whether covered originally by the starter or not. Ordinarily I apply the starter to both of the surfaces to be bonded and then apply the acrylate ester to one of the surfaces. But the reaction initiated on one of the surfaces makes the application of the starter to the other surface unnecessary.

The selected acrylate ester when not available commercially, is made by conventional esterification technique. Thus the selected glycol or ether thereof is mixed with the selected one of the acrylic acids, in approximately equivalent proportions for the purpose of esterification but suitably with a 5%–30% excess of the acrylic acid, sulfuric acid, sulfonic, or like acid catalyst of esterification in the proportion of about 0.5% on the weight of the glycol or ether, and an inhibitor of polymerization. An example of the latter is hydroquinone in the proportion of 0.1% or so of the weight of the selected acrylic acid. Suitably there is introduced an azeotroping liquid for water removal such as benzene or toluene in the proportion of about 1–2 times the weight of the glycol. The whole is then fractionated, as by being heated in a still under a column, to the boiling temperature of the mixture. The azeotrope which goes through the column is condensed in a down condenser and is separated in a collecting trap into water which is formed in the esterification reaction and the hydrocarbon, the latter being returned to the still. This operation is continued until esterification is substantially complete as shown by the water no longer coming over. Volatiles are then distilled away. The remaining glycol ester is freed from unreacted acid and acidic catalyst by the conventional means of water extraction, washing and then subsequently drying the ester.

As to conditions of use of the composition as an adhesive, the selected organic peroxide initiator is mixed into the monomeric acrylate ester in any convenient manner and dissolved therein, the term "peroxide" being used herein to include the initiators introduced as peresters such as one of those listed above. If the selected peroxide is itself not a liquid at ordinary temperatures, it is dissolved to advantage in a chemically inert solvent therefor such as dibutyl phthalate or a hydrocarbon such as the hydrocarbon which, in oxidation, has given the peroxide. Thus the cumene hydroperoxide would be used in solution in cumene, the cumene solvent being the unoxidized portion of the original cumene which was subjected to oxidation, to make the hydroperoxide.

The starter, i.e., the formamide, is applied by brushing, spraying or dipping. The use of a volatile solvent is not necessary since the formamide itself is a liquid.

The bonding of surfaces with the adhesive composition is effected with the exclusion of air, as between a bolt and a nut threaded thereon, and with the adhesive in contact with a divalent or other polyvalent metal.

The invention will be further illustrated by detailed description in connection with the following specific examples of the practice of it. In these examples and elsewhere herein proportions are expressed as parts by weight unless specifically stated to the contrary.

Example 1

The adhesive used had the formula:

| Component: | Parts |
|---|---|
| Tetraethylene glycol dimethacrylate | 25 |
| Hydroquinone | 0.0005 |
| Diisopropylbenzene hydroperoxide | 2.5 |

A drop of formamide was placed on the threads of the cadmium plated steel bolt. The nut was then screwed on the thread and removed, thus distributing the primer over both of the surfaces to be adhered.

Then the nut was removed, a drop of the adhesive composition of the formula above was applied to the bolt and the nut screwed over the applied adhesive.

Polymerization was noted three hours after the assembly was made. Twenty-four hours later, the polymerization had been effected and the assembly sealed so that a torque of 10 pounds was required to break the seal and remove the nut.

In a comparison test the assembly was made as described except that the priming with formamide was omitted. No evidence of polymerization was detected after 48 hours.

Example 2

Prior to assembling steel nuts and bolts, a drop of formamide was placed on the bolt surface to be covered with a nut. With a cloth, the formamide was spread evenly. Then the nut was threaded on and the composition of Example 1 was applied. Within five minutes, an increase in viscosity was noted in the assembled portion. Within two hours, the nut could no longer be turned on the bolt. Twenty-four hours after the application, the polymerization was essentially complete.

Example 3

When zinc-plated nuts and bolts were substituted for cadmium-plated nut and bolt of Example 1 and treated with formamide and then with the adhesive composition of Example 1 and assembled as there described, the polymerization was essentially complete within twenty-four hours and the nut and bolts were sealed together.

Tin-coated nuts and bolts are also bonded together by this application of formamide and adhesive.

Example 4

Fifty parts of formamide and fifty parts of butyl Carbitol were mixed together. A drop of this composition was applied to a cadmium plated bolt, a similar nut was threaded on. The adhesive composition of Example 1 was applied. Twenty-four hours later, the nut and bolt were sealed together. However, the torque required to open this assembly was one-half the amount obtained when formamide as the primer was used alone as in Example 3.

Example 5

A composition of 90 parts of commercial tetraethylene glycol dimethacrylate containing 0.002 part of hydroquinone and 10 parts of ditertiary butyl peroxide was prepared by stirring the components together. A drop of this composition was applied to a cadmium-plated nut and bolt assembly which had previously been treated with formamide, as in Example 3. Within twenty-four hours, the nut and bolt were sealed together.

Example 6

A composition of 90 parts of hydroxyethyl methacrylate and 10 parts of ditertiary butyl peroxide was prepared by stirring the components together. A drop of this composition was applied to a cadmium-plated nut and bolt assembly which had previously been treated with formamide as in Example 3. Within twenty-four hours, the nut and bolt were sealed together.

Example 7

The procedure and composition of Example 1 are used except that the tetraethyleneglycol dimethacrylate there used is replaced in turn by an equal weight of the dimethacrylate of any of the other glycols listed above, by the diacrylate of any of the glycols shown herein and by the monomethacrylate and monoacrylate of the $C_1$–$C_3$ alkyl ethers of the said glycols.

The adhesives so made are satisfactory when used in conjunction with the formamide starter.

Example 8

The procedure of any of the Examples of 1–7 is followed except that the formamide starter is applied to only one of the polyvalent metal surfaces to be bonded and the film of adhesive is applied thereover or to the other of the metal surfaces.

In all cases, the two surfaces are maintained in contact with the film until polymerization to a hardened adhesive occurs. Room temperatures are satisfactory for the bonding.

Example 9

The adhesive used had the formula:

| Component: | Parts |
|---|---|
| Neopentyl glycol dimethacrylate | 25 |
| Hydroquinone | 0.0005 |
| Ditertiary butyl peroxide | 2.5 |

The adhesive is used to bond two surfaces of each of several metals and metal compositions, used separately and in turn, and selected from the group consisting of copper, nickel, platinum, aluminum, other metals of groups III–VIII of the Periodic Table of the Chemical Elements, brass, bronze and steel.

In this use, the formamide is applied to the surface of a sheet of the selected metal, the adhesive coated on the surface to be plied with the first sheet, the whole assembled with the thus treated surfaces together, and the contact maintained, as by pressure or gravity, until the adhesive cures. For metals on which the adhesive sets very slowly or not at all, when the formamide is not used, the latter makes the adhesive curable in a reasonably short time. For metals such as iron, on which the adhesive will cure without the formamide, there is acceleration of the rate. In one operation using an iron bolt and nut, curing required several times as long without the use of formamide as when the formamide was used.

It will be understood that it is intended to cover all changes and modifications of the examples of the invention herein chosen for the purpose of illustration which do not constiute departures from the spirit and scope of the invention.

I claim:

1. In bonding surfaces, one of which at least is a metal selected from the group consisting of metals of Groups III to VIII of the Periodic Table, copper, cadmium, zinc and alloys and compositions thereof, the process which comprises applying formamide to at least one metallic surface, said metallic surface being selected from said group, applying a monomer selected from the group consisting of the dimethacrylates and diacrylates of water soluble glycols and the monomethacrylates and monoacrylates of $C_1$–$C_3$ alkyl ethers of said glycols, and an organic peroxide initiator of polymerization of ethenoid monomers to a surface to be bonded, and maintaining the surfaces in contact with the applied materials therebetween, the resulting contact of formamide, monomer and initiator causing polymerization of the monomer.

2. The process of adhering surfaces of metals selected from the group consisting of metals of Group III to VIII of the Periodic Table, copper, cadmium, zinc and alloys and compositions thereof, which comprises applying formamide as polymerization starter to one of said surfaces, applying a mixture of a monomeric dimethacrylate of a water soluble glycol and an organic peroxide initiator of ethenoid bond polymerization to another of said surfaces, and maintaining said surfaces in contact with the applied materials therebetween, the resulting contact of the formamide, dimethacrylate, and initiator causing polymerization of the dimethacrylate.

3. The process of claim 1, said metal being selected from the group consisting of zinc, cadmium, tin, iron and aluminum.

4. The process of claim 1, said surface being zinc.

5. The process of claim 1, said surface being cadmium.

6. The process of claim 1, said surface being tin.

7. The process of claim 1, said surface being iron.

8. The process of claim 1, said glycol being tetraethylene glycol.

9. The process of claim 2, said glycol being neopentyl glycol.

10. The process of claim 1, said monomer being tetraethylene glycol dimethacrylate.

11. The process of claim 1, which includes mixing into said monomer, before the bonding is effected and as a moderator of the ultimate bond strength, a glycol ether of the formula $RO-C_2H_4-O-C_2H_4-OR'$ in which R is an alkyl group having 3–6 carbon atoms and R′ is selected from the group consisting of $C_1$–$C_3$ alkyls and hydrogen.

References Cited by the Examiner

UNITED STATES PATENTS

| | | | |
|---|---|---|---|
| 2,435,769 | 2/48 | Cheyney et al. | 260—78.5 |
| 2,628,178 | 2/53 | Burnett et al. | 260—89.5 |
| 2,817,620 | 12/57 | Golick et al. | 156—310 |
| 2,833,741 | 5/58 | Lal | 260—89.5 |
| 2,854,370 | 9/58 | Kronstein | 148—6.15 |
| 2,895,950 | 7/59 | Kreible | 260—89.5 |

EARL M. BERGERT, *Primary Examiner.*